(12) United States Patent
Ouchi

(10) Patent No.: US 12,133,230 B2
(45) Date of Patent: Oct. 29, 2024

(54) COMMUNICATION APPARATUS, CONTROL METHOD THEREFOR AND COMPUTER-READABLE STORAGE MEDIUM

(71) Applicant: CANON KABUSHIKI KAISHA, Tokyo (JP)

(72) Inventor: Masatomo Ouchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 659 days.

(21) Appl. No.: 17/233,990

(22) Filed: Apr. 19, 2021

(65) Prior Publication Data
US 2021/0243792 A1 Aug. 5, 2021

Related U.S. Application Data

(63) Continuation of application No. PCT/JP2019/034340, filed on Sep. 2, 2019.

(30) Foreign Application Priority Data

Oct. 19, 2018 (JP) .................................. 2018-197845

(51) Int. Cl.
*H04W 72/04* (2023.01)
*H04W 72/121* (2023.01)
(Continued)

(52) U.S. Cl.
CPC ......... *H04W 72/23* (2023.01); *H04W 72/121* (2013.01); *H04W 84/12* (2013.01)

(58) Field of Classification Search
CPC ... H04W 72/23; H04W 72/121; H04W 84/12; H04W 74/04; H04W 74/004; H04W 74/006
See application file for complete search history.

(56) References Cited

U.S. PATENT DOCUMENTS

| 10,904,920 B1* | 1/2021 | Noh | .................. H04W 72/04 |
| 2014/0092806 A1* | 4/2014 | Kidron | .................. G06F 13/12 |
| | | | 370/328 |

(Continued)

FOREIGN PATENT DOCUMENTS

| JP | 2017-536000 A | 11/2017 |
| WO | 2016/054389 A1 | 4/2016 |
| WO | 2017/156211 A1 | 9/2017 |

OTHER PUBLICATIONS

Alfred Asterjadhi (Qualcomm Inc.), MAC Capabilities in HE Capailities IE, IEEE 802. 11-16/1188rO, IEEE, Internet <URL: https://mentor.ieee.org/802.11/dnc/16/11-16-1188-00-00ax-mac-capabilities-in-he-capabilities-ie.pptx>, Sep. 11, 2016, pp. 1-11.

*Primary Examiner* — Lan-Huong Truong
(74) *Attorney, Agent, or Firm* — Canon U.S.A., Inc. IP Division

(57) ABSTRACT

A communication apparatus for transmitting, to a plurality of terminals, a trigger frame for executing uplink transmission: obtains, from each of the plurality of terminals, ability information indicating a preparation time necessary to start transmission after a resource unit; selects terminals as destinations of one trigger frame from the plurality of terminals; and transmits the trigger frame for the selected terminals by adding a padding area to ensure the preparation times of the selected terminals. The communication apparatus selects the terminals from the plurality of terminals based on the pieces of ability information so that a total sum of the added padding area becomes small.

15 Claims, 13 Drawing Sheets

(51) Int. Cl.
*H04W 72/23* (2023.01)
*H04W 84/12* (2009.01)

(56) References Cited

U.S. PATENT DOCUMENTS

| | | | |
|---|---|---|---|
| 2017/0164358 A1* | 6/2017 | Morioka | H04B 7/028 |
| 2017/0170932 A1 | 6/2017 | Chu | |
| 2020/0374870 A1* | 11/2020 | Guo | H04W 72/0446 |
| 2021/0409075 A1* | 12/2021 | Yang | H04W 74/04 |
| 2022/0110119 A1* | 4/2022 | Song | H04W 72/0453 |

* cited by examiner

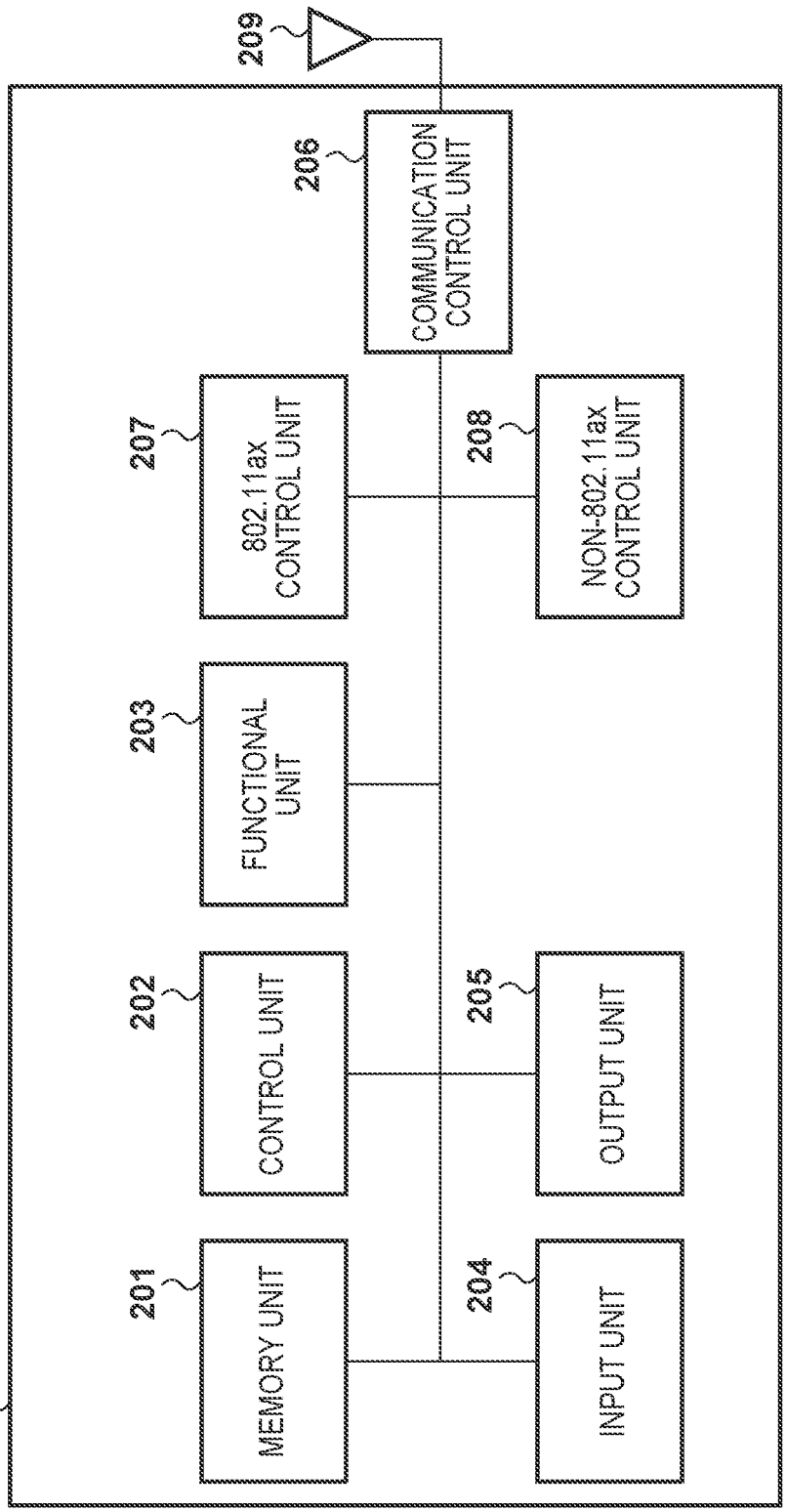

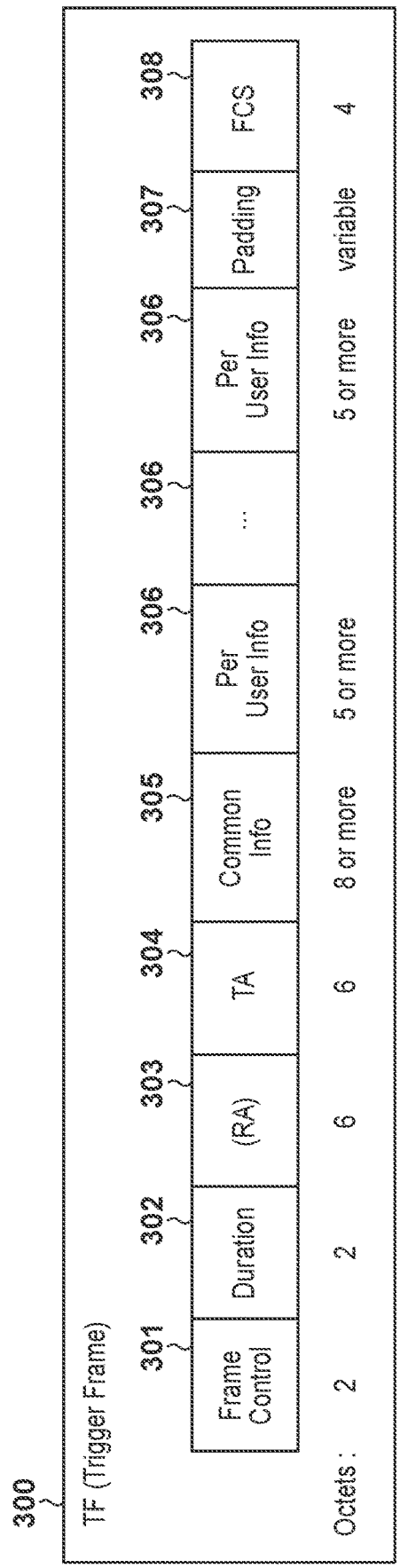

Common Info 305

| Trigger Type | Length | Cascade Indication | CS Required | BW | GI And LTF Type | MU-MIMO LTF Mode | Number of HE-LTF Symbols | STBC |
|---|---|---|---|---|---|---|---|---|
| 311 | 312 | 313 | 314 | 315 | 316 | 317 | 318 | 319 |

Bits: 4 | 12 | 1 | 1 | 2 | 2 | 1 | 3 | 1

| LDPC Extra Symbol Segment | AP TX Power | Packet Extension | Spatial Reuse | Dropper | HE-SIG-A Reserved | Reserved | Trigger Dependent Common Info |
|---|---|---|---|---|---|---|---|
| 320 | 321 | 322 | 323 | 324 | 325 | 326 | 327 |

Bits: 1 | 6 | 3 | 16 | 1 | 9 | 1 | variable

311

31

| Trigger Type subfield value | Description |
|---|---|
| 0 | Basic Trigger |
| 1 | Beamforming Report Poll(BFRP) |
| 2 | MU-BAR |
| 3 | MU-RTS |
| 4 | Buffer Status Report Poll(BSRP) |
| 5 | GCR MU-BAR |
| 6 | Bandwidth Query Report Poll(BQRP) |
| 7 | NDP Feedback Report Poll(NFRP) |
| 8-15 | Reserved |

315

32

| BW subfield value | Description |
|---|---|
| 0 | 20 MHz |
| 1 | 90 MHz |
| 2 | 80 MHz |
| 3 | 80+80 MHz or 160 MHz |

| index | MAC ADDRESS | AID | MinTrigProcTime (μsec) |
|---|---|---|---|
| 1 | 00:00:85:00:00:01 | 1 | 8 |
| 2 | 00:00:85:00:00:02 | 2 | 16 |
| 3 | 00:00:85:00:00:03 | 3 | 8 |
| 4 | 00:00:85:00:00:04 | 4 | 16 |

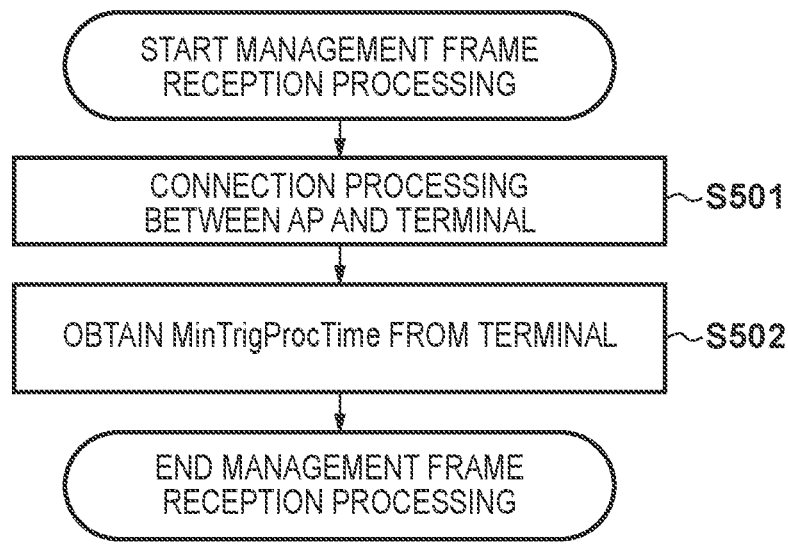
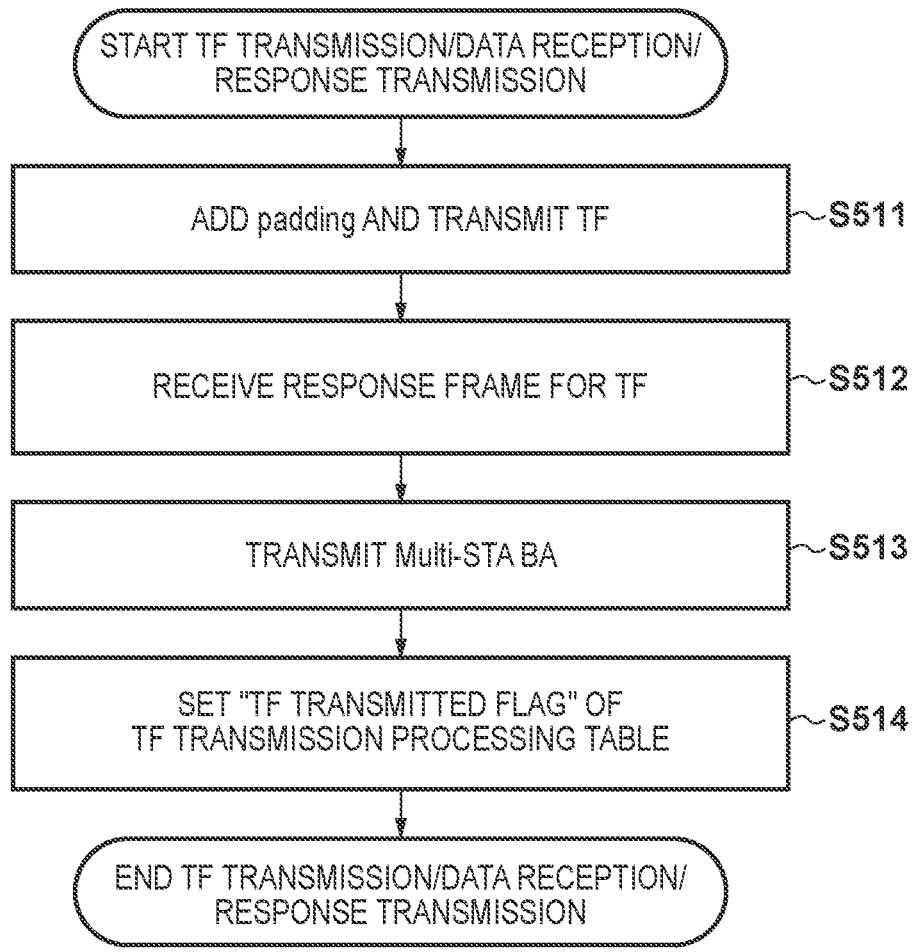

FIG. 7

| index | MAC ADDRESS | AID | MinTrigProcTime (μsec) | MinTrigProcTime_tmp | TRANSMITTED FLAG |
|---|---|---|---|---|---|
| 1 | 00:00:85:00:00:01 | 1 | 8 | | |
| 2 | 00:00:85:00:00:02 | 2 | 16 | | |
| 3 | 00:00:85:00:00:03 | 3 | 8 | | |
| 4 | 00:00:85:00:00:04 | 4 | 16 | | |
| 5 | 00:00:85:00:00:05 | 5 | 8 | | |
| 6 | 00:00:85:00:00:06 | 6 | 16 | | |
| 7 | 00:00:85:00:00:07 | 7 | 8 | | |
| 8 | 00:00:85:00:00:08 | 8 | 16 | | |
| 9 | 00:00:85:00:00:09 | 9 | 0 | | |
| 10 | 00:00:85:00:00:0A | 10 | 0 | | |
| 11 | 00:00:85:00:00:0B | 11 | 0 | | |
| 12 | 00:00:85:00:00:0C | 12 | 0 | | |
| 13 | 00:00:85:00:00:0D | 13 | 0 | | |
| 14 | 00:00:85:00:00:0E | 14 | 0 | | |
| 15 | 00:00:85:00:00:0F | 15 | 0 | | |
| 16 | 00:00:85:00:00:10 | 16 | 0 | | |
| 17 | 00:00:85:00:00:11 | 17 | 0 | | |
| 18 | 00:00:85:00:00:12 | 18 | 0 | | |
| 19 | 00:00:85:00:00:13 | 19 | 16 | | |
| 20 | 00:00:85:00:00:14 | 20 | 8 | | |

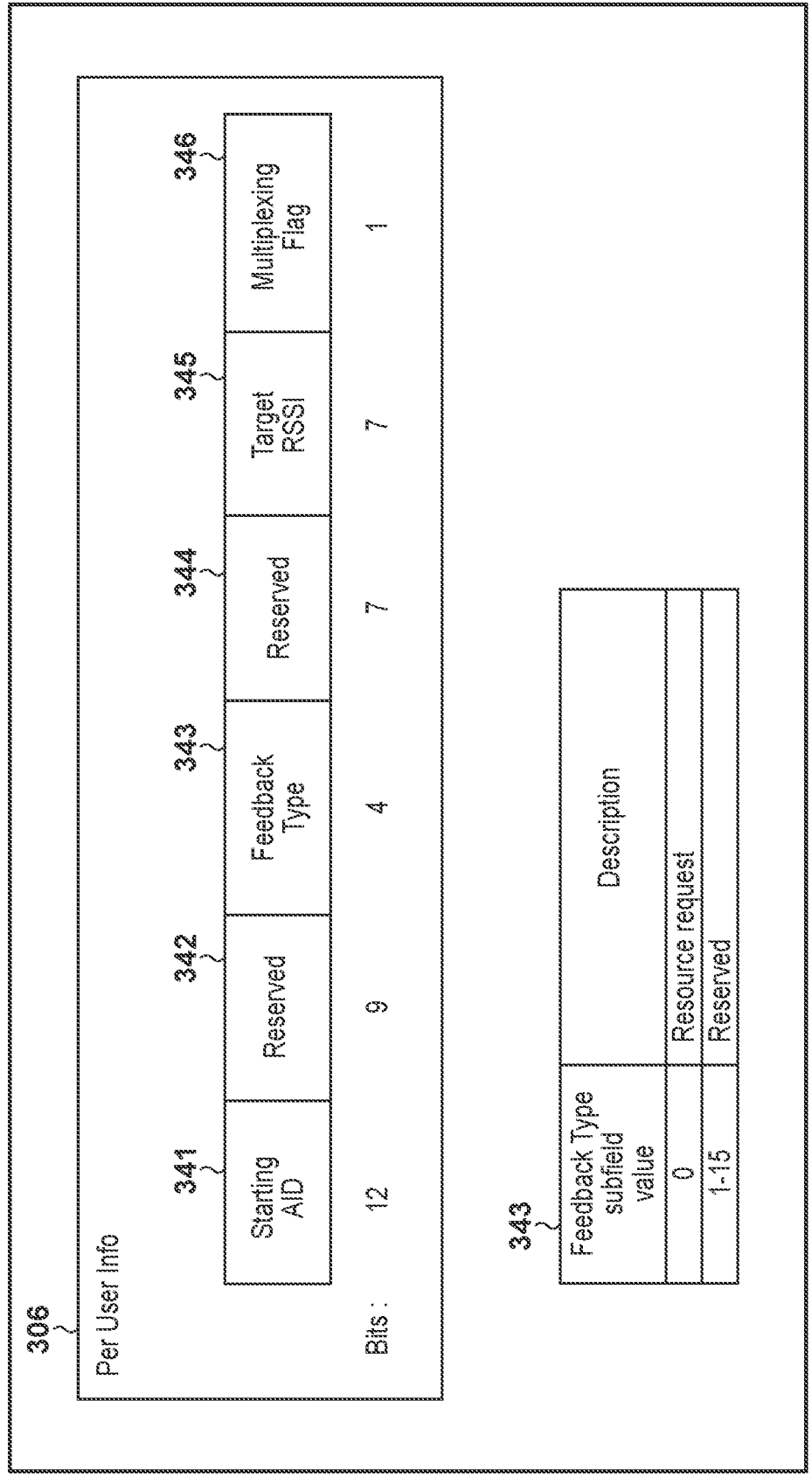

COMMUNICATION APPARATUS, CONTROL METHOD THEREFOR AND COMPUTER-READABLE STORAGE MEDIUM

CROSS-REFERENCE TO RELATED APPLICATIONS

This application is a Continuation of International Patent Application No. PCT/JP2019/034340, filed Sep. 2, 2019, which claims the benefit of Japanese Patent Application No. 2018-197845, filed Oct. 19, 2018, both of which are hereby incorporated by reference herein in their entireties.

BACKGROUND OF THE INVENTION

Field of the Invention

The present invention relates to a communication apparatus, a control method therefor and a computer-readable storage medium.

Background Art

In recent years, the IEEE802.11ax standard that aims to efficiently use a wireless medium in an environment in which a number of wireless apparatuses exist has been issued as a draft standard. The draft standard aims to efficiently use the wireless medium when a plurality of terminals transmit frames at the same time by using, as a trigger, an activation signal that is called a trigger frame (TF) from an access point and includes resource unit assignment. According to this standard, a wireless access point transmits an activation signal to a plurality of terminals, each terminal that has received a trigger frame as the activation signal transmits response data after a predetermined time elapses, and then the wireless access point receives the response data.

On the other hand, the terminal that has received the trigger frame transmits data using the assigned resource unit after a time called a SIFS (Short Inter Frame Space) elapses. However, to perform transmission using the resource unit, the terminal needs to make an advance preparation. PTL 1 discloses a technique in which a terminal requests a time required for a preparation to an access point and the access point adds, to a trigger frame, a padding area based on the time.

CITATION LIST

Patent Literature

PTL 1: U.S. Patent Laid-Open No. 2017-0170932

However, in an environment in which a number of terminals exist, the transmission preparation abilities of the terminals are different and thus the request times of the terminals are also different accordingly. When transmitting a plurality of trigger frames to a group of terminals of different request times, the time and the wireless medium are wasted due to addition of an excessive padding area unless the destinations of each trigger frame are set appropriately.

SUMMARY OF THE INVENTION

The present invention provides a technique of reducing the occurrence of an unnecessary delay time caused by addition of a padding area.

According to one aspect of the present invention, there is provided a communication apparatus for transmitting, to a plurality of terminals, a trigger frame for executing uplink transmission, the apparatus comprising: an obtaining unit configured to obtain, from each of the plurality of terminals, ability information indicating a preparation time necessary to start transmission after a resource unit to be used is designated by the trigger frame; a selecting unit configured to select terminals as destinations of one trigger frame from the plurality of terminals; and a transmitting unit configured to transmit the trigger frame for the selected terminals by adding a padding area to ensure the preparation times of the terminals selected by the selecting unit, wherein the selecting unit selects the terminals from the plurality of terminals based on the pieces of ability information so that a total sum of the padding area added by the transmitting unit becomes small.

According to another aspect of the present invention, there is provided a control method for a communication apparatus for transmitting, to a plurality of terminals, a trigger frame for executing uplink transmission, the method comprising: obtaining, from each of the plurality of terminals, ability information indicating a preparation time necessary to start transmission after a resource unit to be used is designated by the trigger frame; selecting terminals as destinations of one trigger frame from the plurality of terminals; and transmitting the trigger frame for the selected terminals by adding a padding area to ensure the preparation times of the terminals selected in the selecting, wherein in the selecting, the terminals are selected from the plurality of terminals based on the pieces of ability information so that a total sum of the padding area added in the transmitting becomes small.

According to another aspect of the present invention, there is provided a non-transitory computer-readable storage medium storing a program for causing a computer to execute a control method for a communication apparatus for transmitting, to a plurality of terminals, a trigger frame for executing uplink transmission, the method comprising: obtaining, from each of the plurality of terminals, ability information indicating a preparation time necessary to start transmission after a resource unit to be used is designated by the trigger frame; selecting terminals as destinations of one trigger frame from the plurality of terminals; and transmitting the trigger frame for the selected terminals by adding a padding area to ensure the preparation times of the terminals selected in the selecting, wherein in the selecting, the terminals are selected from the plurality of terminals based on the pieces of ability information so that a total sum of the padding area added in the transmitting becomes small.

Advantageous Effects of Invention

According to the present invention, it is possible to reduce the occurrence of an unnecessary delay time caused by addition of a padding area.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain principles of the invention.

FIG. 2 is a block diagram showing an example of the hardware arrangement of an access point and a terminal;

FIG. 3A is a view showing an example of the data structure of a TF;

FIG. 3B is a view showing an example of the data structure of a Common Info field of the TF;

FIG. 4A is a table showing an example of a terminal table according to the first embodiment;

FIG. 5A is a flowchart illustrating management frame reception processing;

FIG. 5B is a flowchart illustrating TF transmission/data reception/response transmission processes;

FIG. 7 is a table showing an example of a TF transmission processing table according to the second embodiment; and FIG. 8 is a view showing an example of the data structure of a Per User Info field of an NFRP TF.

DESCRIPTION OF THE EMBODIMENTS

Hereinafter, embodiments of the present invention will be described with reference to the accompanying drawings.

First Embodiment

Figure 1:
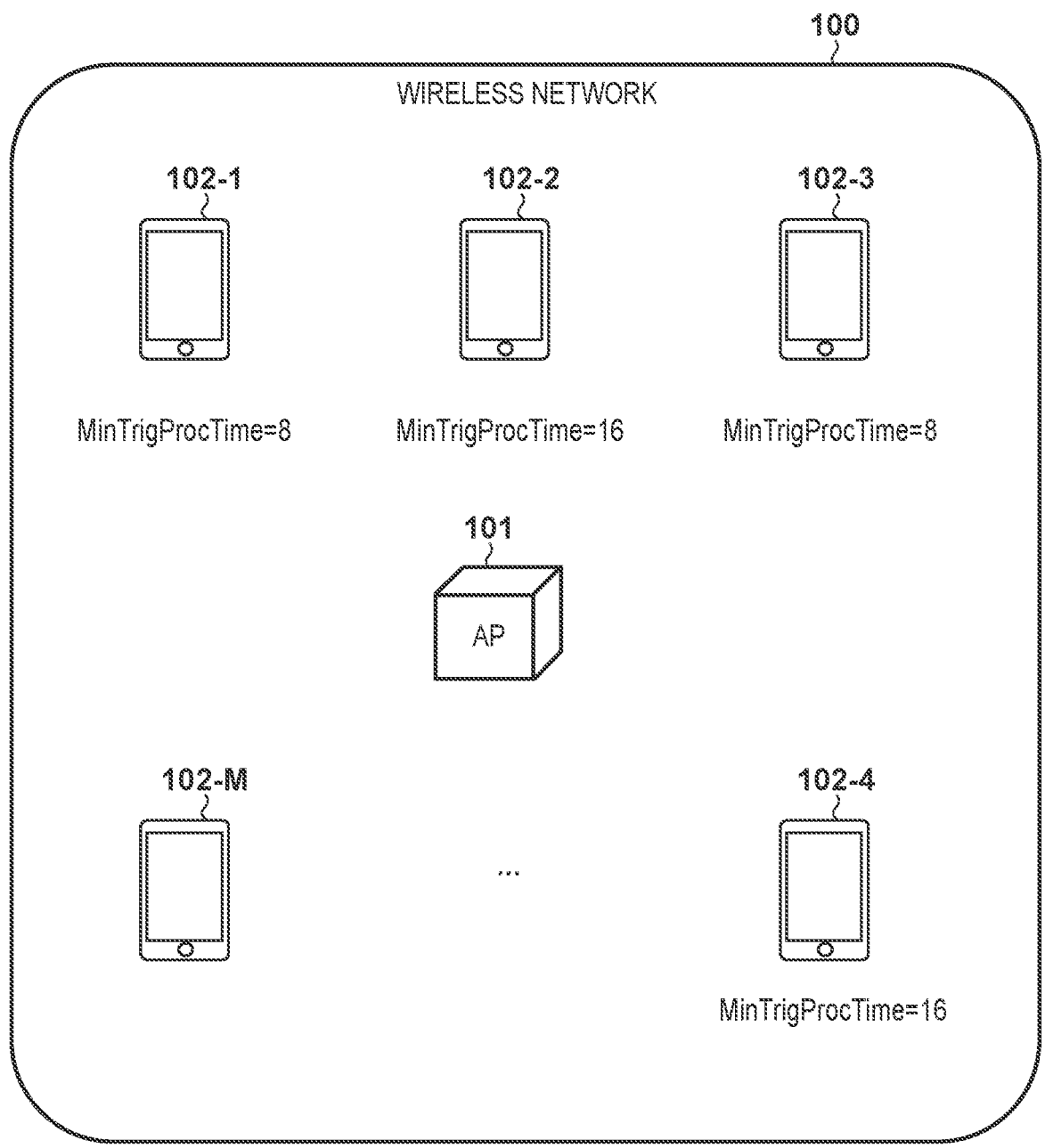
FIG. 1 is a view showing an example of the configuration of a communication system according to an embodiment.

FIG. 1 is a diagram showing an example of the configuration of a communication system according to the embodiment. An AP 101 is an access point complying with IEEE802.11ax. Terminals 102 comply with IEEE802.11ax, and are connected to a wireless network 100 created by the AP 101. "-" (hyphen) and a number added to each terminal 102 indicate the terminal of the same model. M of a terminal 102-M can take a number up to 2007 as the maximum value of an AID (Association Identifier) according to the IEEE802.11 standard. In this configuration, if the AP 101 transmits a trigger frame (TF) to each terminal 102, the terminal 102 performs data transmission (uplink transmission (Up Link)) using a resource unit (RU) assigned by the TF.

FIG. 2 shows the hardware arrangement of the AP 101 and the terminal 102. FIG. 2 shows the common arrangement of the AP 101 and the terminal 102, and unique components of the AP 101, those of the terminal 102, and the like are not illustrated.

A memory unit 201 is formed by a memory such as a ROM or a RAM, and stores programs for performing various kinds of operations (to be described later) and various kinds of information such as communication parameters for wireless communication. Note that as the memory unit 201, a storage medium such as a flexible disk, a hard disk, an optical disk, a magnetooptical disk, a CD-ROM, a CD-R, a magnetic tape, a nonvolatile memory card, or a DVD may be used instead of the memory such as a ROM or a RAM. Furthermore, the memory unit 201 may include a plurality of memories.

A control unit 202 is formed by a processor such as a CPU or an MPU, and implements various kinds of processes in each of the AP 101 and the terminal 102 by executing the programs stored in the memory unit 201. Note that the control unit 202 may control each terminal by cooperation of an OS (Operating System) and the programs stored in the memory unit 201. Furthermore, the control unit 202 may be formed by a plurality of processors such as a multicore processor, and control each terminal. In addition, the control unit 202 controls a functional unit 203 to execute predetermined processing such as an access point function, image capturing, printing, or projection. The functional unit 203 is a hardware component used by the AP 101 or the terminal 102 to execute the predetermined processing.

An input unit 204 accepts various kinds of operations from a user. An output unit 205 performs various kinds of output operations to the user. The output operations by the output unit 205 include at least one of display on a screen, audio output by a loudspeaker, vibration output, and the like. Note that both the input unit 204 and the output unit 205 may be implemented by one module, like a touch panel.

A communication control unit 206 controls wireless communication complying with the IEEE802.11 series or Wi-Fi, or controls IP (Internet Protocol) communication. More specifically, the communication control unit 206 can operate as an AP/terminal complying or not complying with IEEE802.11ax by switching between an IEEE802.11ax control unit 207 and a non-IEEE802.11ax control unit 208. Furthermore, the communication control unit 206 controls an antenna 209 to transmit/receive a wireless signal for wireless communication.

FIG. 3A shows an example of the structure of the trigger frame (TF) according to the first embodiment. A TF 300 is a frame newly introduced from IEEE802.11ax, and indicates an activation timing necessary for a plurality of terminals (users) to perform frame transmission to the AP simultaneously, wireless channel information using the frame, and the like.

Reference numeral 301 denotes a Frame Control field common to the IEEE802.11 series, which has a value indicating a trigger frame of IEEE802.11ax. The length of the Frame Control field 301 is 2 octets (bytes). Reference numeral 302 denote a Duration field 302 which has a length of 2 octets; 303, an RA (Receiver Address) field which has a length of 6 octets; 304, a TA (Transmitter Address) field which has a length of 6 octets; and 305, a Common Info field which indicates information common to a plurality of terminals as destinations of the TF. The length of the Common Info field 305 is equal to or more than 8 octets, and details thereof will be described later with reference to FIG. 3B.

Reference numeral 306 denotes a Per User Info field which indicates individual information for each destination of the TF. The length of the Per User Info field 306 is equal to or more than 5 octets, and details thereof will be described later with reference to FIG. 3C. Reference numeral 307 denotes a Padding field which is used to give an additional time to the group of terminals which have received the TF; and 308, an FCS (Frame Check Sequence) field.

FIG. 3B shows an example of the data structure of the Common Info field 305. Reference numeral 311 denotes a Trigger Type (type) subfield which has a length of 4 bits. Details of this subfield are as indicated by "Description" of a table 31 shown in FIG. 3B. For example, the value of the Trigger Type subfield is 4 for a BSRP TF, 6 for a BQRP TF, and 7 for an NFRP TF. Note that BSRP is an abbreviation for Buffer Status Report Poll, BQRP is an abbreviation for Bandwidth Query Report Poll, and NFRP an abbreviation for NDP (Null Data Packet) Feedback Report.

Reference numeral 312 denotes a Length subfield which has a length of 12 bits. The value of the Length subfield 312 indicates a time (duration) of response data for the TF, and is reflected on the L-SIG field of a physical layer in an IEEE802.11 frame. The L-SIG (Legacy Signal Field or non-HT SIGnal field) indicates the duration of a frame including this field. Reference numeral 313 denotes a Cascade Indication subfield which has a length of 1 bit. Note that the region of the Cascade Indication subfield 313 may be represented as a More TF. Reference numeral 314 denotes a CS (Carrier Sense) Required subfield which has a length of 1 bit.

Reference numeral 315 denotes a BW (Bandwidth) subfield which has a length of 2 bits. Details of this subfield are as indicated by "Description" of a table 32 shown in FIG. 3B. For example, if the bandwidth of an operating channel is 20 MHz, the value of this subfield is 0. Reference numeral 316 denotes a GI And LTF Type (Guard Interval And Long Training Field Type) subfield which has a length of 2 bits; 317, an MU-MIMO LTF Mode subfield which has a length of 1 bit; 318, a Number of HE LTF Symbols subfield which has a length of 3 bits; and 319, an STBC (Space Time Block Code) subfield which has a length of 1 bit.

Reference numeral 320 denotes an LDPC (Low Density Parity Check) Extra Symbol Segment subfield which has a length of 1 bit; 321, an AP TX Power subfield which has a length of 6 bits; 322, a Packet Extension subfield which has a length of 3 bits; 323, a Spatial Reuse subfield which has a length of 16 bits; 324, a Dropper subfield which has a length of 1 bit; and 325, an HE-SIG-A Reserved subfield which has a length of 9 bits. Note that "HE-SIG-A" is a representative of HE-SIG-A1 to HE-SIG-A4. Reference numeral 326 denotes a Reserved subfield which has a length of 1 bit; and 327, a Trigger Dependent Common Info subfield which has a variable length. This portion indicates additional information corresponding to the Trigger Type subfield 311.

Figure 3C:
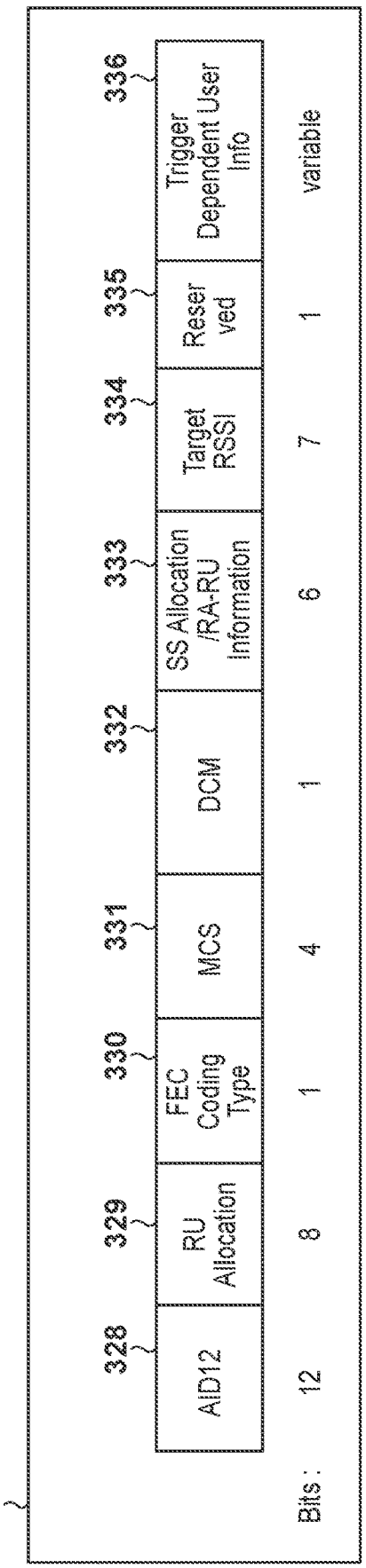
FIG. 3C is a view showing an example of the data structure of a Per User Info field of the TF other than an NFRP TF.

Details of the Per User Info field 306 will be described next with reference to FIG. 3C. Reference numeral 328 denotes an AID12 subfield. A terminal having the same AID value as the value of this subfield is the destination of the Per User Info field, and uses the assigned RU. Note that determination of matching with the AID value is performed by 12 LSBs (Least Significant Bits). Note that AID12=0 indicates, as the destination, not a specific terminal but an arbitrary terminal associated with (connected to) the AP. AID12=2045 indicates, as the destination, an arbitrary terminal not associated with the AP. Furthermore, AID12=2046 indicates that no RU (resource unit) is assigned. Reference numeral 329 denotes an RU Allocation subfield which indicates the index of the RU; 330, an FEC Coding Type subfield which indicates the coding type of response data to the TF; 331, an MCS (Modulation and Coding Scheme) subfield which indicates a coding scheme used for a response frame to the TF; and 332, a DCM (Dual Carrier Modulation) subfield of the response frame to the TF.

Reference numeral 333 denotes an SS Allocation/RA-RU information subfield which indicates the spatial stream of the response frame to the TF when the AID of the terminal is neither 0 nor 2045. Furthermore, when the AID of the terminal is 0 or 2045, the SS Allocation/RA-RU information subfield 333 indicates an RA-RU (Random Access Resource Unit). Reference numeral 334 denotes a Target RSSI (Received Signal Strength Indicator) subfield which indicates reception power, at the AP, of the response frame to the TF expected by the AP; 335, a Reserved subfield; and 336, a Trigger Dependent User Info subfield which is a portion whose contents change depending on the Trigger Type subfield 311.

An operation in the communication system according to the first embodiment will be described with reference to FIGS. 4A and 4B. The arrangement of the apparatuses in the communication system includes the AP 101 and the four terminals 102-1 to 102-4 of FIG. 1. The terminals 102-1 to 102-4 may be referred to as STAs 1 to 4 hereinafter.

FIG. 4A shows a terminal table 400 managed by the AP 101. The terminal table 400 is held in the memory unit 201. Reference numeral 401 denotes an index of the table. Note that a terminal name added with the index number may be used in the following description. That is, the terminal of index=1 is STA 1 or the terminal 102-1. Reference numeral 402 denotes a MAC address of the terminal. The MAC address 402 is in a display format in which 48 bits are divided by a colon (:) for every 8 bits. Reference numeral 403 denotes an AID that is an identifier of which the STA is notified from the AP 101 when association (connection) between the AP 101 and the STA is established.

Reference numeral 404 denotes a MinTrigProcTime value which is information notified by a Trigger Frame MAC Padding Duration of an HE Capabilities element of a Management frame complying with the IEEE802.11 standard. Note that HE is an abbreviation for High Efficiency. The Trigger Frame MAC Padding Duration has 2 bits, and 0/1/2 correspond to MinTrigProcTime values of 0 (zero) usec/8 usec/16 usec, respectively. The name "MinTrigProcTime" is derived from the meaning of the minimum value of the preparation times for transmission using the RU (resource unit) designated by the Trigger Frame. Note that the Management Frame is a Probe Request, Association Request, Authentication Request, or the like. The AP 101 can grasp the preparation time required by the STA to use the RU in processing for connecting to the STA with reference to the Trigger Frame MAC Padding Duration.

A communication system formed from one AP 101, two terminals (terminals 102-1 and 102-3) whose MinTrigProcTime value is 8 usec, and two terminals (terminals 102-2 and 102-4) whose MinTrigProcTime value is 16 usec will be exemplified below.

Figure 4B:
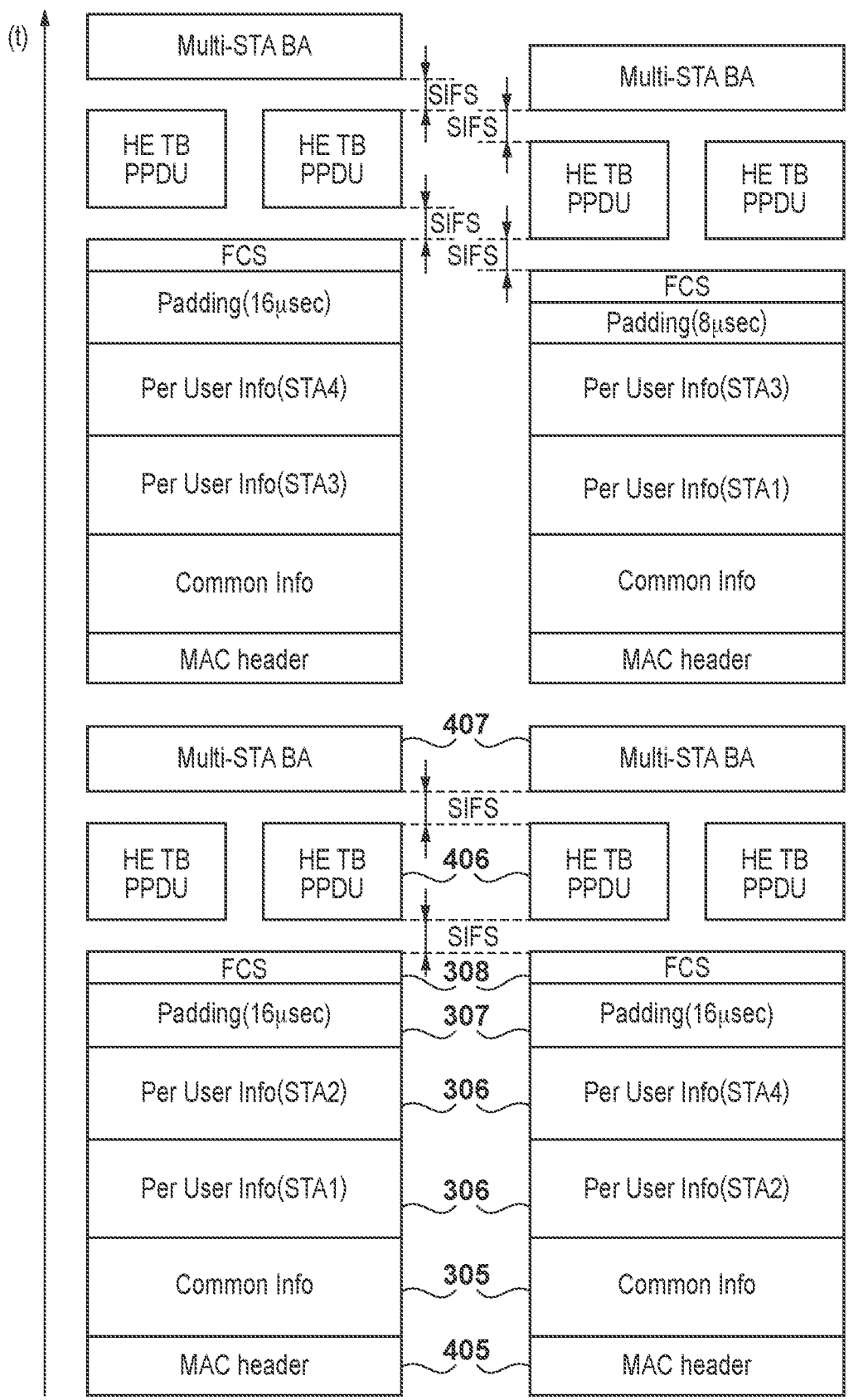
FIG. 4B is a view for explaining a sequence according to the first embodiment.

FIG. 4B is a view showing an operation sequence in the communication system according to the first embodiment. For comparison, in FIG. 4B, a general operation sequence is shown in the left portion and an operation sequence when control of this embodiment is applied is shown in the right portion. In FIG. 4B, the time advances from below to above. Referring to FIG. 4B, reference numeral 405 denotes a MAC header which collectively represents the fields from the Frame Control field 301 to TA field 304 of FIG. 3A. With respect to the fields from the Common Info field 305 to the FCS field 308, the reference numerals in FIG. 3A are used intact. The operation sequence shown in FIG. 4B shows a state wherein a sequence in which the AP 101 transmits a Basic Trigger Frame, receives data from each destination terminal, and transmits a response is repeated twice.

In the general operation sequence shown in the left portion of FIG. 4B, when creating the first TF, the AP 101 selects terminals of AID=1 (STA 1) and AID=2 (STA 2) in the order of the AIDs, and decides the parameters of the Per User Info fields 306. Furthermore, the length of the Padding field 307 of the TF 300 is set to a value corresponding to 16 μsec as the maximum value of the MinTrigProcTime values of STAs 1 and 2. As described above, by setting the length of the Padding field 307 to the value corresponding to the maximum MinTrigProcTime value, all the terminals can each ensure the preparation time. Finally, the FCS field 308 is calculated, thereby completing transmission of the TF.

The two terminals (STAs 1 and 2) each of which has received the first TF each transmit an HE TB PPDU 406 to the AP 101. HE TB PPDU is an abbreviation for High Efficiency Trigger Based Physical layer Protocol Data Unit. Upon receiving the HE TB PPDUs, the AP 101 returns a Multi-STA BA 407 to each of the two terminals (STAs 1 and 2). BA is an abbreviation for Block Ack. Subsequently, the same processing is performed to transmit the second TF 300 destined for STAs 3 and 4. In this general operation sequence, the lengths of the padding fields of the first and second TFs are equal to a value corresponding to 16 μsec.

The operation sequence shown in the right portion of FIG. 4B according to this embodiment will be described next. In this sequence, the AP 101 sets, as the destinations of the TF 300, terminals having the same MinTrigProcTime value. That is, as the destinations of the first TF, STAs 2 and 4 of MinTrigProcTime=16 μsec are selected. Next, as the destinations of the second TF, STAs 1 and 3 of MinTrigProcTime=8 μsec are selected. If the destination terminals of the TFs are selected in this way, the length of the padding field of the first TF is 16 μsec but the length of the padding field of the second TF can be 8 μsec. Therefore, as compared with the generation operation sequence shown in the left portion of FIG. 4B, the time is shortened by 8 μsec in the operation sequence according to this embodiment. Note that as the selection order, terminals having the same MinTrigProcTime value need only be continuous. For example, an order of STA 1→STA 3→STA 2→STA 4 may be possible.

Note that when designating, as the destination of the TF, an arbitrary terminal during connection, 0 (zero) is set in the AID12 subfield of the User Info field. A value corresponding to the maximum value of the MinTrigProcTime values of the associated terminals is set in the Padding field 307 at this time. If an unconnected terminal is permitted as the destination of the TF, 2045 is set in the AID12 subfield of the User Info field. A value corresponding to 16 μsec is set in the Padding field 307 at this time. In this case, 16 μsec is the maximum default value of the MinTrigProcTime value. Even if an RU is assigned to a terminal whose AID cannot be specified, it is possible to allow the terminal to ensure the sufficient preparation time for using the RU by setting the Padding field 307, as described above.

Figure 5C:
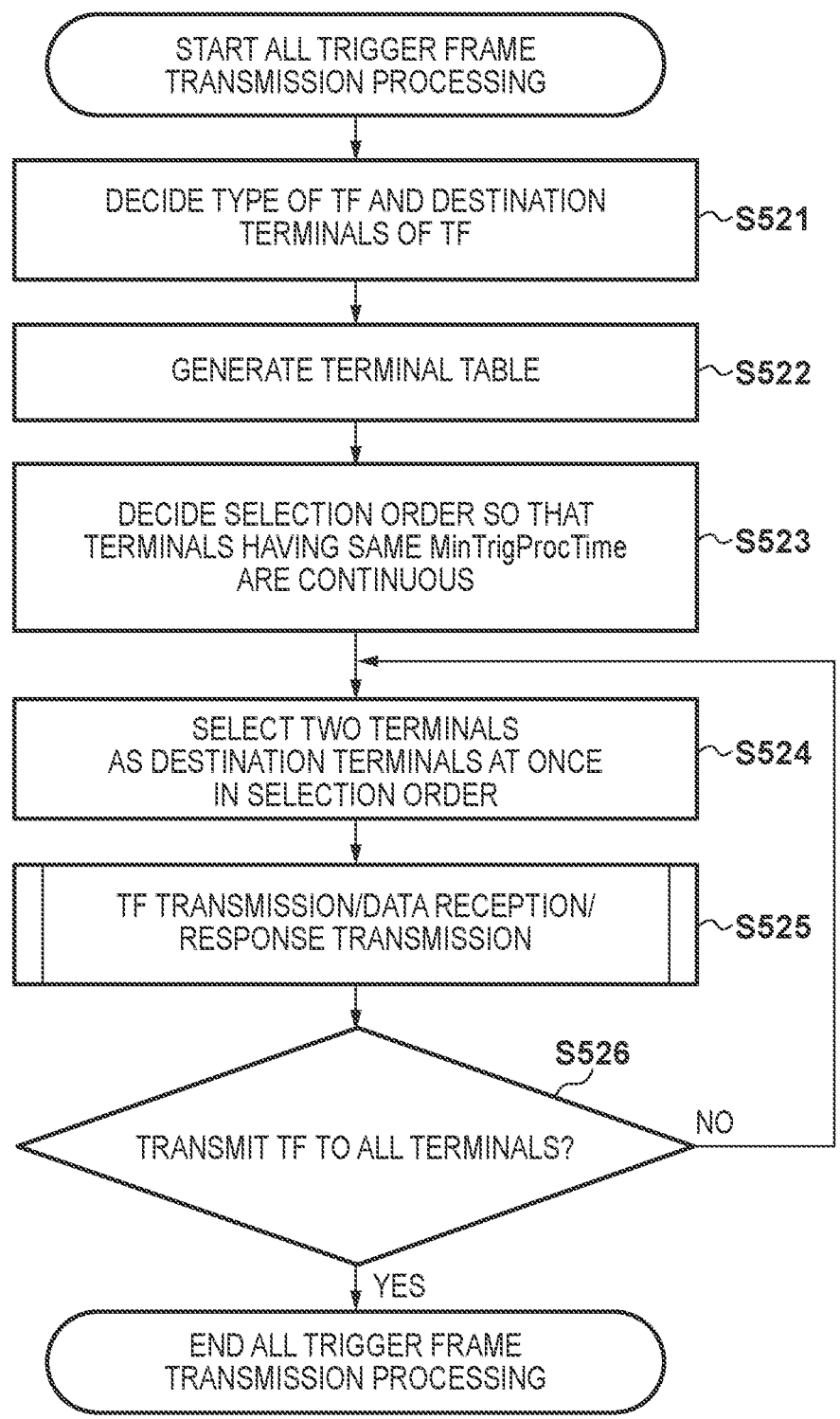
FIG. 5C is a flowchart illustrating all trigger frame transmission processing according to the first embodiment.

The above operation will further be explained with reference to flowcharts shown in FIGS. 5A to 5C. The main subject of the processing is the control unit 202 of the AP 101 unless otherwise specified. FIG. 5A is a flowchart for explaining management frame reception processing. In this processing, the AP 101 obtains, from each of a plurality of terminals connected to the wireless network 100, ability information indicating a preparation time necessary to start transmission after an RU to be used is designated by a trigger frame. In step S501, the AP 101 performs processing to connect or reconnect to each terminal. At this time, the MAC address and the AID are associated with each other and held as management information. In step S502, the AP 101 obtains the MinTrigProcTime value included in the Management frame from each terminal. The MinTrigProcTime value indicates the preparation time necessary for the terminal, for which the RU has been designated, to start transmission.

FIG. 5C is a flowchart for explaining all trigger frame transmission processing. In step S521, the AP 101 decides the type of the TF and the destination terminals of the TF. At this time, not all the terminals are always set as the destinations depending on the type of the TF, the use case, the state of the system, and the like. In step S522, the AP 101 generates the terminal table 400 using the MAC address and AID obtained in step S501 and the MinTrigProcTime value obtained in step S502. In step S523, the AP 101 decides the selection order of the terminals so that the terminals having the same MinTrigProc Time value are continuous. In, for example, the example of the terminal table 400, the selection order is decided to obtain an order of 2→4→1→3 of indices.

In step S524, the AP 101 selects terminals as the destinations of one TF from the plurality of terminals. For example, terminals the number of which is equal to or smaller than the maximum number of destinations which can be included in the TF are selected. In the example shown in FIGS. 4A and 4B, the number of destinations is 2 (decided depending on the method of assigning the RU to be used by the HE TB PPDU) but the present invention is not limited to this. The AP 101 selects two terminals as the destination terminals at once in the selection order decided in step S523. In step S525, the AP 101 transmits the trigger frame to each of the destination terminals selected in step S524, receives corresponding data, and transmits a response. If it is determined in step S526 that there is a terminal to which the trigger frame has not been transmitted (NO in step S526), the process returns to step S524, and the next terminals in the selection order are selected as the destination terminals. If the trigger frame has been transmitted to all the terminals (YES in Step S526), this processing ends.

FIG. 5B is a flowchart for explaining the TF transmission/data reception/response transmission processes in step S525. In step S511, the AP 101 decides the length of the Padding field 307 appended to the last Per User Info field of the TF, and transmits the TF. That is, the AP 101 adds the padding field to ensure the preparation times of the terminals selected in step S524. In step S512, the AP 101 receives the response frame (HE TB PPDU 406) from each destination terminal of the TF 300. In step S513, after the period of the SIFS elapses since reception of the response frames, the AP 101 transmits the Multi-STA BA 407 (Block Ack). Processing in step S514 is processing necessary in the second embodiment, and is not performed in the first embodiment.

As described above, according to the first embodiment, the length of the padding field in the trigger frame can be minimized, thereby improving the use efficiency of the wireless medium. As a result, this contributes to improvement of the throughput of the overall system targeted by IEEE802.11ax.

Second Embodiment

In the above-described first embodiment, two Per User Info fields are included in the TF. This is caused by the method of assigning the RU to be used by the HE TB PPDU 406. However, in the IEEE802.11ax standard, in an operation using a 20-MHz band, the maximum number of destinations is 9, and up to nine Per User Info fields can be designated in one TF. An operation according to the embodiment in which the number of Per User Info fields is not limited to 2. According to the second embodiment, a value different from that notified from a terminal using a Management frame (a Trigger Frame MAC Padding Duration of an HE Capabilities element) may be reflected on the value of a Padding field 307.

First, a TF transmission processing table for implementing the second embodiment will be described with reference to FIG. 7. A TF transmission processing table 700 shown in FIG. 7 is obtained by adding two pieces of information to the terminal table 400 of the first embodiment. An index 401, a MAC address 402, an AID 403, and a MinTrigProcTime value 404 are the same as in FIG. 4A. Reference numeral 701 denotes a MinTrigProcTime_tmp value. The MinTrigProcTime_tmp value 701 indicates a variable for temporarily processing, as the MinTrigProcTime value of the terminal, a value different from the MinTrigProcTime value notified from the terminal using the Management frame. The role of the MinTrigProcTime_tmp value 701 will be apparent from a description with reference to flowcharts shown in FIGS. 6A and 6B.

Reference numeral 702 denotes a transmitted flag which has a 1-bit value indicating a clear state or set state. If the transmitted flag 702 indicates the clear state, it is indicated that the TF has not been transmitted to the terminal of the corresponding index. On the other hand, with respect to the terminal to which the TF has been transmitted, the transmitted flag 702 is set in the set state.

Subsequently, a TF generation and transmission operation according to the second embodiment will be described with reference to the flowcharts shown in FIGS. 5A, 5B, 6A, and 6B. The main subject of the processing is a control unit 202 of an AP 101 unless otherwise specified.

The basic concept of a control procedure will first be described. That is, "a TF is formed by including, as destinations, only terminals each having a small MinTrigProcTime value, as much as possible, but if the total number of transmission TFs increases by forming the TFs in that way, such terminals are designated by the same TF as that including, as destinations, terminals each having a large MinTrigProcTime value". The reason why a plurality of TFs are formed is that the length of a TF obtained by excluding a padding field is longer than a difference in padding length. That is, the occupied time of a wireless medium is shorter in a case in which a TF formed by including, as destinations, only terminals of MinTrigProcTime=0 μsec is individually transmitted than in a case in which a TF is transmitted by additionally including, as destinations, terminals of MinTrigProcTime=8 or 16 μsec. Therefore, in this embodiment, as long as the number (total number) of TFs to be transmitted does not increase, terminals are selected so terminals having different MinTrigProcTime values (preparation times) are not mixed in one trigger frame.

In step S501 of FIG. 5A, the AP 101 performs connection or reconnection processing to each terminal. At this time, the MAC address 402 and the AID 403 of the TF transmission processing table are updated. In step S502, the AP 101 obtains the MinTrigProcTime value included in the Management frame from each terminal, and sets/updates the MinTrigProcTime value 404 of the TF transmission processing table 700.

Steps S511 to S514 of FIG. 5B indicate TF transmission/data reception/response transmission processes. Operations in steps S511 to S513 are the same as in the first embodiment. That is, in step S511, the AP 101 decides the length of the Padding field 307 appended to the last Per User Info field in the TF, adds the Padding field 307, and transmits the TF. In step S512, the AP 101 receives a response frame from each destination terminal of a TF 300. In step S513, the AP 101 transmits a Multi-STA BA (Block Ack). In step S514, the AP 101 sets the TF transmitted flag 702 of the TF transmission processing table in the set state.

Note that processing performed when an error occurs in the series of processes from the TF transmission processing to the response transmission processing is general error processing and a description thereof will be omitted. A case in which the series of processes advances normally will be described below.

In step S601, the AP 101 decides the type of a TF and the destination terminals of the TF. Not all the terminals are always set as the destinations depending on the type of the TF, the use case, the state of the system, and the like. In step S602, the AP 101 initializes the TF transmission processing table 700. Initialization of the TF transmission processing table 700 indicates setting the MinTrigProcTime_tmp value 701 of the table to the same value as that of the MinTrigProcTime value 404 with respect to the destination terminals of the TF, and setting the transmitted flag 702 in the clear state. With respect to a terminal that is not the destination of the TF, the transmitted flag 702 is set in the set state for the sake of convenience. By setting the transmitted flag 702 in the set state, the corresponding terminal can be excluded from the target of processes in step S603 and subsequent steps, that is, the target of the destination of the TF.

In step S603, the AP 101 decides the maximum number of destinations per TF based on a usable wireless band. For example, if an RU (Resource Unit) formed from 26 tones in a 20-MHz band is assigned, the maximum number of destinations is 9. The maximum number of destinations is constant in the all trigger frame transmission processing starting from step S601. Next, in step S604, the AP 101 calculates the number of TFs necessary to transmit the TFs to all the destination terminals. The number of TFs can be calculated by a ceiling function (total number of destination terminals/maximum number of destinations per TF) when the type of the TF is not NFRP. A ceiling function (x) returns a smallest integer equal to or larger than x with respect to a real number. That is, the number of TFs to be transmitted is a smallest integer value equal to or larger than a real number obtained by dividing the number of the plurality of terminals as the TF transmission targets by the maximum number of destinations. In step S605, the AP 101 sets 0 (zero) as the initial value of a padding_current value.

In step S606, the AP 101 counts the number of terminals of "MinTrigProcTime_tmp=padding_current" and "transmitted flag=clear" among the destination terminals existing in the TF transmission processing table 700. The AP 101 sets the obtained number of terminals as a NUM_STA_candidate value. In step S607, the AP 101 determines whether the NUM_STA_candidate value is equal to or larger than the maximum number of destinations decided in step S603. If it is determined that "NUM_STA_candidate≥maximum number of destinations" (YES in step S607), the process advances to step S608.

In step S608, the AP 101 selects terminals the number of which corresponds to the maximum number of destinations from the terminals of MinTrigProcTime_tmp=padding_current. In step S609, the AP 101 executes the TF transmission/data reception/response transmission processes (S511 to S514) shown in FIG. 5B with each of the terminals selected in step S608. After that, the process returns to step S606.

On the other hand, if it is determined in step S607 that "NUM_STA_candidate<maximum number of destinations" (NO in step S607), the process advances to step S610. In step S610, the AP 101 determines whether the NUM_STA_candidate value is equal to or larger than 1. If "NUM_STA_candidate≥1" (YES in step S610), the process advances to step S611; otherwise, the process advances to step S614. In step S611, it is determined whether the number of TFs to be transmitted to all the terminals increases when the AP 101 selects the terminals of MinTrigProcTime_tmp=padding_current and performs TF transmission.

More specifically, determination is performed by [1+ceiling function (("number of terminals of "transmitted flag=clear"–NUM_STA_candidate)/maximum number of destinations)≤ceiling function (("number of terminals of "transmitted flag=clear")/maximum number of destinations)]. In this determination formula, "1" of the first term on the left-hand side indicates transmission of "one" TF in which terminals of MinTrigProcTime_tmp=padding_current are set as destinations. The second term on the left-hand side indicates the number of TFs necessary to transmit the TFs to all the terminals existing in a set obtained by excluding the terminals as the destinations of the one TF of the first term from a set of terminals of "transmitted flag=clear" in the TF transmission processing table 700. On the right-hand side of the determination formula, the number of TFs necessary to transmit the TFs to all the terminals (all the terminals of "transmitted flag=clear") to which the TF has not been transmitted is calculated simply using the ceiling function.

Therefore, it is determined by the above determination formula whether the number of TFs transmitted in the all trigger frame transmission processing increases when only the terminals of MinTrigProcTime_tmp=padding current are set as the destinations of the TF. In other words, it is determined whether the number of TFs obtained in step S604 increases.

For example, when the total number of terminals of transmitted flag=clear is 13, the NUM_STA_candidate value is 4, and the maximum number of destinations is 9, the left-hand side of the determination formula in step S611 is 2 and the right-hand side is 2. This indicates that even if only the terminals of MinTrigProcTime_tmp=padding_current are set as the destinations of the TF, the total number of necessary transmission TFs is unchanged. In this case, since the number of TFs does not increase (NO in step S611), the process advances to step S612. In step S612, the AP 101 selects the terminals of MinTrigProcTime_tmp=padding_current. Then, in step S613, the AP 101 performs the TF transmission/data reception/response transmission processes for each of the terminals selected in step S612 (FIG. 5B). Thus, the AP 101 transmits the TF in which only the terminals of MinTrigProcTime_tmp=padding_current are set as the destinations.

In step S614, the AP 101 counts the number of terminals of transmitted flag=clear with reference to the TF transmission processing table 700. If the count result is not 0 (zero), there exists a terminal to which the TF has not been transmitted, and thus the process advances to step S615. In step S615, the AP 101 sets the padding_current value to the next value. The process returns to step S606. Setting the padding_current value to the next value indicates setting the padding_current value to 8 when the current value is 0 and to 16 when the current value is 8. Note that the next value does not exist when the current value is 16. In this control procedure, however, when the current value is 16, the process never advances to step S615. In implementation of software (program), if the process advances to step S615 when the current value is 16, this processing ends.

A case in which it is determined in step S611 that the number of TFs increases (YES in step S611) and the process advances to step S616 will be described next. For example, if the total number of terminals of "transmitted flag=clear" is 13, the NUM_STA_candidate value is 2, and the maximum number of destinations is 9, the left-hand side of the determination formula described in step S611 is 3, the right-hand side is 2, and the relationship of the termination formula is not satisfied. This indicates that the total number of necessary TFs increases when only the terminals of MinTrigProcTime_tmp=padding current are set as the destinations of the TF.

In step S616, the AP 101 sets, to the next value, the MinTrigProcTime_tmp value of each terminal of "MinTrigProcTime_tmp=padding_current" and "transmitted flag=clear". Setting the MinTrigProcTime_tmp value to the next value indicates setting the MinTrigProcTime_tmp value to 8 when the current value is 0 and to 16 when the current value is 8, similar to the padding current value. Then, the process advances to step S615, and the AP 101 sets the padding_current value to the next value, and returns the process to step S606. Note that similar to the control operation in step S615, when the current value is 16, step S616 is never executed.

In step S614, if the count result of the terminals of "transmitted flag=clear" is 0 (zero), that is, there is no terminal to which the TF has not been transmitted, the all trigger frame transmission processing ends.

Note that if the padding_current value is 16 and the total number of transmission TFs does not increase, the maximum number of destinations need not be selected in step S608. For example, if the number of terminals of transmitted flag=clear is 16 and the maximum number of destinations is 9, the number of necessary TFs is 2. At this time, according to the flowcharts shown in FIGS. 6A and 6B, the TF of "number of destinations (number of Per User Info fields 306)=9" and the TF of "number of destinations=7" are transmitted. In this case, two TFs of "number of destinations=8" may be transmitted.

Flowchart Progress Example 1

Figure 6A:
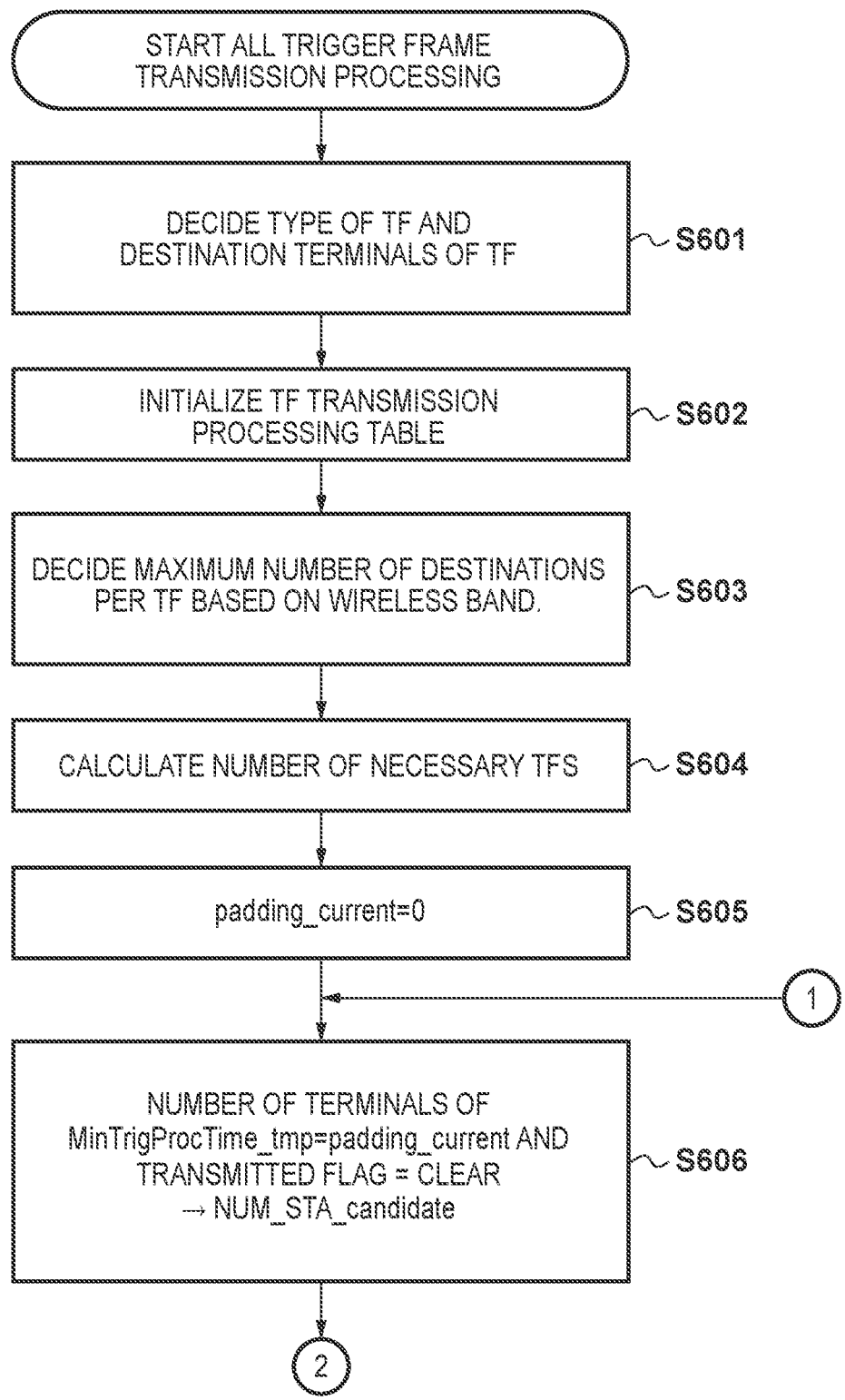
FIG. 6A is a flowchart illustrating all trigger frame transmission processing according to the second embodiment.
Figure 6B:
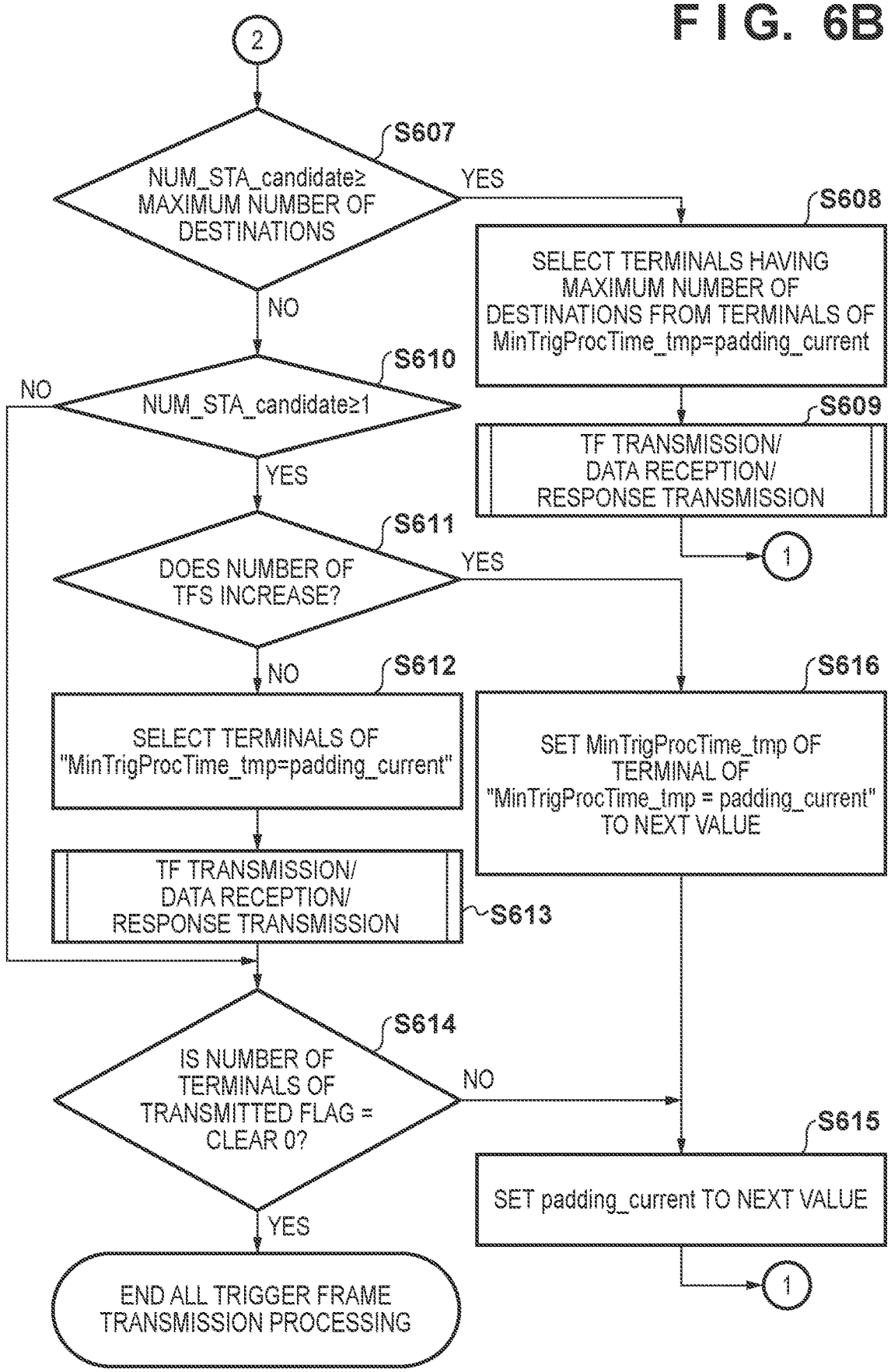
FIG. 6B is a flowchart illustrating the all trigger frame transmission processing according to the second embodiment.

For the purpose of assisting understanding of the flowcharts, the procedure of the processing shown in FIGS. 6A and 6B when the numbers of terminals of the MinTrigProcTime values of 0, 8, and 16 μsec are 12, 11, and 17, respectively, will be described.

The destination terminals of the TF are decided in step S601, the TF transmission processing table 700 is initialized in step S602, the maximum number of destinations is set to 9 in step S603, the number of necessary TFs is set to 5 in step S604, and the padding_current value is set to 0 in step S605. In initialization of the TF transmission processing table 700, the MinTrigProcTime value is set as the MinTrigProcTime_tmp value.

In step S606, 12 which is the number of terminals of MinTrigProcTime_tmp=0 is set as the NUM_STA_candidate value. Since NUM_STA_candidate (=12)≥maximum number of destinations (=9), the process branches to YES in step S607, and nine terminals of MinTrigProcTime_tmp=0 are selected in step S608. In step S609, the "first TF" including nine Per User Info fields corresponding to the terminals selected in step S608 is transmitted. As a result, the numbers of terminals of transmitted flag=clear in the TF transmission processing table 700 are 3, 11, and 17 for the MinTrigProcTime values of 0, 8, and 16 μsec, respectively.

Next, in step S606, the number (3) of terminals of MinTrigProcTime_tmp=0 is set as the NUM_STA_candidate value. Since NUM_STA_candidate (=3)<maximum number of destinations (=9), the process branches to NO in step S607. Since NUM_STA_candidate (=3)≥1, the process branches to YES in step S610. Since the left-hand side in the above-described determination formula is 5 and the right-hand side is 4, it is determined in step S611 that the number of TFs increases, and the process branches to YES. In step S616, the MinTrigProcTime_tmp value of the terminal of MinTrigProcTime_tmp=0 μsec is set to the next value (8 μsec). As a result, with respect to the MinTrigProcTime_tmp values of 0, 8, and 16 μsec, the numbers of terminals are 0, 14=(3+11), and 17, respectively. In step S615, the padding_current value is set to the next value (8 μsec).

Next, in step S606, the number (14) of terminals of MinTrigProcTime_tmp=8 is set as the NUM_STA_candidate value. Since NUM_STA_candidate (=14)≥maximum number of destinations (=9), the process branches to YES in step S607. In step S608, nine terminals of MinTrigProcTime_tmp=0 are selected. In step S609, the "second TF" including nine Per User Info fields corresponding to the terminals selected in step S608 is transmitted. As a result, the numbers of terminals of transmitted flag=clear in the TF transmission processing table 700 are 0, 5, and 17 for the MinTrigProcTime values of 0, 8, and 16 μsec, respectively.

Next, in step S606, the number (5) of terminals of MinTrigProcTime_tmp=8 is set as the NUM_STA_candidate value. Since NUM_STA_candidate (=5)<maximum number of destinations (=9), the process branches to NO in step S607. Since NUM_STA_candidate (=3)≥1", the process branches to YES in step S610. Since the left-hand side in the above-described determination formula is 3 and the right-hand side is 3, it is determined in step S611 that the number of TFs does not increase, and the process branches to NO. In step S612, five terminals of MinTrigProcTime_tmp=8 are selected. In step S613, the "third TF" including five Per User Info fields corresponding to the terminals selected in step S612 is transmitted. As a result, the numbers of terminals of transmitted flag=clear in the TF transmission processing table 700 are 0, 0, and 17 for the MinTrigProcTime_tmp values of 0, 8, and 16 μsec, respectively. After that, the process branches to NO in step S614, and the padding_current value is set to the next value (16 μsec) in step S615.

In step S606, 17 which is the number of terminals of MinTrigProcTime_tmp=16 is set as the NUM_STA_candidate value. Since NUM_STA_candidate (=17)≥maximum number of destinations (=9), the process branches to YES in step S607. In step S608, nine terminals of MinTrigProcTime_tmp=16 are selected. In step S609, the "fourth TF" including nine Per User Info fields corresponding to the terminals selected in step S608 is transmitted. As a result, the numbers of terminals of transmitted flag=clear in the TF transmission processing table 700 are 0, 0, and 8 for the MinTrigProcTime values of 0, 8, and 16 μsec, respectively.

Next, in step S606, the number (8) of terminals of MinTrigProcTime_tmp=16 is set as the NUM_STA_candidate value. Since NUM_STA_candidate (=8)<maximum number of destinations (=9), the process branches to NO in step S607. Since NUM_STA_candidate (=8)≥1, the process branches to YES in step S610. Since the left-hand side in the above-described determination formula is 1 and the right-hand side is 1, it is determined in step S611 that the number of TFs does not increase, and the process branches to NO. In step S612, eight terminals of MinTrigProcTime_tmp=16 are selected. In step S613, the "fifth TF" including eight Per User Info fields corresponding to the terminals selected in step S612 is transmitted. As a result, the numbers of terminals of transmitted flag=clear in the TF transmission processing table 700 are 0, 0, and 0 for the MinTrigProcTime_tmp values of 0, 8, and 16 μsec, respectively. After that, the process branches to YES in step S614, and the process ends.

Flowchart Progress Example 2

As another example, the procedure of the flowcharts when the numbers of terminals of the MinTrigProcTime values of 0, 8, and 16 μsec are 0, 5, and 6, respectively, will be described.

The destination terminals of the TF are decided in step S601, the TF transmission processing table 700 is initialized in step S602, the maximum number of destinations is set to 9 in step S603, the number of necessary TFs is set to 2 in step S604, and the padding_current value is set to 0 in step S605. In initialization of the TF transmission processing table 700, the MinTrigProcTime value is set as the MinTrigProcTime_tmp value.

In step S606, the number (0) of terminals of MinTrigProcTime_tmp=0 is set as the NUM_STA_candidate value. Since the NUM_STA_candidate value (=0) is obtained, the process branches to NO in step S607, and further branches to NO in step S610. After that, the process advances from step S614 (NO) to step S615, and the padding_current value is set to the next value (8 μsec).

Next, in step S606, the number (5) of terminals of MinTrigProcTime_tmp=8 is set as the NUM_STA_candidate value. Since NUM_STA_candidate (=5)<maximum number of destinations (=9), the process branches to NO in step S607. Since NUM_STA_candidate (=3)≥1, the process branches to YES in step S610. Since the left-hand side in the above-described determination formula is 2 and the right-hand side is 2, it is determined in step S611 that the number of TFs does not increase, and the process branches to NO. In step S612, five terminals of MinTrigProcTime_tmp=8 are selected. In step S613, the "first TF" including five Per User Info fields corresponding to the terminals selected in step S612 is transmitted. As a result, the numbers of terminals of transmitted flag=clear in the TF transmission processing table 700 are 0, 0, and 6 for the MinTrigProcTime_tmp values of 0, 8, and 16 μsec, respectively. After that, the process branches to NO in step S614, and the padding_current value is set to the next value (16 μsec) in step S615.

Next, in step S606, the number (6) of terminals of MinTrigProcTime_tmp=16 is set as the NUM_STA_candidate value. Since NUM_STA_candidate (=6)<maximum number of destinations (=9), the process branches to NO in step S607. Since NUM_STA_candidate (=6)≥1, the process branches to YES in step S610. Since the left-hand side in the above-described determination formula is 1 and the right-hand side is 1, it is determined in step S611 that the number of TFs does not increase, and the process branches to NO. In step S612, six terminals of MinTrigProcTime_tmp=16 are selected. In step S613, the "second TF" including six Per User Info fields corresponding to the terminals selected in step S612 is transmitted. As a result, the numbers of terminals of transmitted flag=clear in the TF transmission processing table 700 are 0, 0, and 0 for the MinTrigProcTime_tmp values of 0, 8, and 16 μsec, respectively. After that, the process branches to YES in step S614, and the process ends.

Third Embodiment

The third embodiment considers two constraint conditions in the above-described processing (decision of the type of the TF and destination terminals) in step S521 or S601.

The first constraint condition is based on a Trigger Type. As described in the first and second embodiments, it is assumed that it is possible to adjust which TF includes each terminal as a destination when transmitting a plurality of TFs in the series of processes. However, if a Trigger Type subfield 311 indicates MU-BAR (Multi User Block Ack Request), MU-RTS, or GCR MU-BAR in FIG. 3B, the adjustment becomes complicated. This is because the destinations of the TFs are decided independently of the MinTrigProcTime values by downlink data generated before transmission of the TFs. If adjustment is performed, the downlink data is held and accumulated to some extent, and then downlink multi user transmission is performed to terminals of the same MinTrigProcTime value.

On the other hand, with respect to the Trigger Type other than the above-described ones, adjustment of which TF includes each terminal as a destination among the plurality of TFs can be executed without performing processing of holding data or the like. Therefore, in step S601, the first constraint condition is that the TF is of a type other than MU-BAR, MU-RTS, and GCR MU-BAR. More generally, the first constraint condition is that the TF is of a type other than that in which destination terminals are decided based on downlink communication. Thus, a plurality of terminals as the destinations of the TF are formed by terminals to which the TF of a type other than that in which destination terminals are decided based on downlink communication is transmitted.

Next, the second constraint condition will be described. The second constraint condition for deciding, in step S601, the plurality of terminals to be set as destination terminals is that "terminals as the transmission targets of a trigger frame, whose effective data of responses have the same length, are destination terminals". In this embodiment, the second constraint condition is based on a difference in effective information of an HE TB PPDU 406. In IEEE802.11ax, to suppress a variation in reception power at an AP as the destination of a response frame to the TF, the ends of the HE TB PPDUs of STAs are aligned. Therefore, even if there is no information designated by the Trigger Type, the STA needs to add a payload padding area to the frame to make the length uniform.

The length of the payload padding area added to the frame will now be described. For example, assume that an RU (Resource Unit) assigned by the TF is formed by 26 tones, the number of streams is 1, the MCS is 256-QAM, the Coding Rate is ¾, and the GI is 1.6 μsec. In this case, the data rate of the HE TB PPDU is 10 Mbps. With this data rate, a data amount communicated for 8 μsec is 80 bits=10 bytes. That is, a shortened time of 8 μsec by a Padding field 307 is canceled by the payload padding area of 10 bytes.

As described above, in minimizing the total sum of the Padding field 307, the effect of efficient use of a wireless medium is improved by adding the constraint that no payload padding area is added to the frame. With respect to each Trigger Type, a condition under which there is no difference in length of effective information from each terminal or addition of a payload padding area to a frame is unnecessary will be described.

For Basic Trigger, when the transmission buffer amounts of the respective terminals are equal to each other, there is no difference in length of effective information from each terminal. Each terminal makes a notification of the transmission buffer amount by a BSR (Buffer Status Report). An AP 101 can improve efficiency by deciding, in step S601, as the destination terminals of the TF, terminals having the same transmission buffer amount. Note that even if the transmission buffer amounts are different, the occurrence of a payload padding area can be suppressed by an RU Allocation subfield 329 or an MCS subfield 331 but the processing is complicated. Note that for MU-RTS, if the subsequent TF corresponds to only an UL (Up Link), the same condition as that for Basic Trigger is applied.

For BFRP (Beamforming Report Poll), if a CQI (Channel Quality Indication) requested for each terminal is the same, there is no difference in length of effective information from each terminal. Therefore, the AP 101 can improve efficiency by deciding, in step S601, as the destination terminals of the TF, terminals of the same CQI. For BSRP (Buffer Status Report Poll), when making a notification of one TID (Traffic Identifier) or all TIDs, there is no difference in length of effective information from each terminal. For BQRP (Bandwidth Query Report Poll), there is no difference in length of effective information from each terminal, and thus there is no constraint condition particularly. For NFRP (NDP Feedback Report Poll) as well, there is no difference in length of effective information from each terminal, and thus there is no constraint condition particularly.

Note that in IEEE802.11ax, a regulation of adding a payload padding area to a frame to give an additional time to the reception side includes a so-called Packet Extension subfield. This is a field (signal) appended to the data portion of each PPDU according to IEEE802.11ax. For example, for the HE TB PPDU 406, the AP can designate the duration of the additional field, the coding format, and the modulation scheme by a Packet Extension subfield 322 of the TF. However, this embodiment assumes that there is no difference in duration of the Packet Extension subfield even if the combination of terminals as the transmission sides of the HE TB PPDUs 406 is changed.

As described above, according to the third embodiment, it is possible to improve the effectiveness of the effective use of the wireless medium by adjusting the order of destination terminals in a plurality of TFs in consideration of the first and second constraint conditions in step S601.

Fourth Embodiment

The fourth embodiment will describe improvement of efficiency of TF transmission/data reception when a Trigger Type is NFRP (Null Data Packet Feedback Report Poll) and the numbers of connections and disconnections to and from terminals are small.

The structure of an NFRP TF will first be described. A method of designating the destinations of the NFRP TF is different from that for TFs of other Trigger Types. That is, instead of designating each terminal by an AID12 subfield of a Per User Info field, terminals having AIDs falling within a range of a predetermined number from a Starting AID are set as destinations.

FIG. 8 is a view showing an example of the data structure of a Per User Info field 306 of an NFRP TF. Reference numeral 341 denotes a Starting AID subfield that indicates the beginning AID in a group of the destination terminals of the TF and has a length of 12 bits. "Starting" means that terminals having successive AID values after this Starting AID are set as destinations. Reference numerals 342 and 344 denote Reserved subfields.

Reference numeral 343 denotes a Feedback Type subfield which has a length of 4 bits. When this subfield has 0, the TF is used as a Resource Request. Reference numeral 345 denotes a Target RSSI (Receive Signal Strength Indicator) subfield which has a length of 7 bits; and 346, a Multiplexing Flag subfield which has a length of 1 bit. The Multiplexing Flag subfield 346 indicates the number of streams used by an NDP, and indicates that the number of streams is 1 when bit information is 0 and the number of steams is 2 when the bit information is 1.

Terminals set as the destinations of the NFRP TF having the above structure are terminals having AIDs from "value of Starting AID subfield 341" to "value of Starting AID subfield 341+predetermined number (N)−1". The predetermined number (N) is the multiplication value of "constant k", "value of BW subfield 315+1", and "contents indicated by Multiplexing Flag subfield 346". The constant k is decided by a method of using an OFDMA (Orthogonal Frequency Division Multiple Access) subcarrier on the wireless medium of the NDP for which the NFRP TF makes a transmission request. When the value of the BW subfield 315 is 0 (indicating 20 MHz (see FIG. 3B), k=18 is obtained. In this case, if "contents indicated by Multiplexing Flag subfield 346" are 1, the predetermined number (N) is 18.

Therefore, if the control processing described in the first and second embodiments is performed for the NFRP TF having the above structure, it is assumed that the AIDs of the terminals having the same MinTrigProcTime value are continuous. Therefore, after the arrangement of the terminals of the system is fixed, the AP 101 reassigns the AIDs so that the terminals having the same MinTrigProcTime value are continuous.

Alternatively, the assignment range of the AIDs may be divided into three sections by the MinTrigProcTime values. If, for example, the above-described predetermined number (N) is 18, AIDs from 1 are sequentially assigned to 18 terminals of MinTrigProcTime=0. Similarly, AIDs from 19 are sequentially assigned to 18 terminals of MinTrigProcTime=8, and AIDs from 37 are sequentially assigned to 18 terminals of MinTrigProcTime=16. This can transmit the NFRP TFs to all the terminals while minimizing the sum of the padding areas of the three TFs without reassigning the AIDs.

Fifth Embodiment

In the fifth embodiment, all MinTrigProcTime values are equal to each other. At this time, the processes shown in FIGS. 5C, 6A, and 6B can be simplified more. That is, terminals are sequentially selected as destination terminals and assigned with Per User Info fields up to the maximum number of destinations in order of indices 401 or AIDs 403 of a TF transmission processing table. For example, if the MinTrigProcTime values of all terminals in a wireless communication system are equal to each other, this processing may be executed in step S521 or S601. If the MinTrigProcTime values of all the terminals are 0 (zero), there is no Padding field 307.

Sixth Embodiment

In the sixth embodiment, a time ensured by a Padding field 307 is made unnecessary or decreased by arranging, after a field (Per User Info) corresponding to a terminal whose preparation time is long, a field corresponding to a terminal whose preparation time is short. Note that the following description is applied to TFs other than an NFRP TF.

In the sixth embodiment, Per User Info fields 306 are sequentially arranged from a terminal having a large MinTrigProcTime value in TF transmission processing. Consider, for example, a TF in which three Per User Info fields for terminals of MinTrigProcTime=0 (μsec) are arranged after Per User Info fields for terminals of MinTrigProcTime=8 (μsec). In this case, since each Per User Info field of the TF is 5 bytes (octets) or more, there exists an additional time of 15 bytes or more for the terminal of MinTrigProcTime=8 from when the terminal starts preparation of an RU until the end of the TF. Therefore, if a 15-byte transmission medium time is 8 μsec or more, the Padding field 307 becomes unnecessary.

The above concept also applies to a case in which the Per User Info fields of terminals of MinTrigProcTime=16 (μsec) are arranged at beginning. Even for a combination of the terminals of MinTrigProcTime=16 (μsec) and those of MinTrigProcTime=8 (μsec), it is possible to obtain an effect by arranging the Per User Info fields 306. By arranging the Per User Info fields corresponding to the terminals of MinTrigProcTime=8 after the Per User Info fields corresponding to the terminals of MinTrigProcTime=16, it may be possible to set the Padding field 307 to 8 μsec. Therefore, for example, if terminals having different MinTrigProcTime values are selected as destination terminals in step S525 or S609, the AP 101 arranges the Per User Info fields of the terminals having large MinTrigProcTime values at beginning. This can shorten the time ensured by the Padding field 307. Alternatively, in step S523, decision may be made so that a predetermined number of terminals having small MinTrigProcTime values are arranged after terminals having large MinTrigProcTime values.

Note that in one TF, one RU (Resource Unit) is assigned to one given terminal, which is not only in this embodiment. That is, after analyzing a given Per User Info field 306, a terminal can prepare an RU without processing a subsequent Per User Info field. In the above embodiment, the MinTrigProcTime value is processed as the preparation time of the RU. However, the order of the Padding field 307 and the FCS field 308 may be reverted in the TF structure in consideration of the processing time of the FCS field 308.

Seventh Embodiment

As a further embodiment, an example of adding the Device Class of a terminal as a condition for selecting the destinations of one TF from a plurality of terminals will be described next.

The background for considering the Device Class will be described first. The Device Class includes Class A and Class B into which terminals are classified based on the accuracy of RSSI measurement and the accuracy of the Absolute Transmit Power of the terminal. RSSI is an abbreviation for Received Signal Strength Indicator. More specifically, a terminal of Class A is a terminal having an ability that makes the accuracy of the Absolute Transmit power and that of RSSI measurement fall within a range of ±3 dB. A terminal of Class B is a terminal having an ability that makes the accuracy of Transmit power fall within a range of ±9 dB, makes the accuracy of RSSI measurement fall within a range of ±5 dB, and makes the accuracy of Relative Transmit power fall within a range of ±3 dB. Note that in IEEE802.11ax, the terminal notifies an AP (access point) of the Device Class of itself. This notification is made by an HE PHY Capabilities information element in a management frame such as a Probe Request or Association Request.

In an environment in which terminals of Class A and terminals of Class B are mixed, if signals of terminals with low accuracy of Transmit power like Class B are multiplexed by the OFDMA scheme, a large difference may occur in reception power from each terminal at the AP that has received the multiplex communication. The difference in reception power destroys the orthogonality of OFDMA, thereby increasing the influence of interference between carriers. Especially, the influence of the difference in reception power is large when the reception power is small, and the reception performance of the AP degrades. Therefore, when selecting the destinations of a TF (Trigger Frame) for OFDMA multiplex communication, the AP needs to discriminate between terminals of Class A and Class B.

For example, the following three schemes are possible.

Terminals of Class A and Class B are not selected as destinations of the same TF.

The multiplex number of the terminals of Class B (the number of destinations) is made smaller than that of terminals of Class A.

A robust MCS is used for Class B.

The background concerning the Device Class has been explained, and destination terminals are selected in consideration of this background in the seventh embodiment. That is, in the processing in step S608 or S612 of "selecting terminals having the same MinTrigProcTime value", a selection condition is further added. In other words, in the terminal selection processing in step S608 or S612, an operation of preferentially selecting terminals having the same transmission quality (Device Class) is performed.

As a practical example, in step S608, assume that the maximum number of destinations is 9 and a NUM_STA_candidate value is 15 in which nine terminals are of Class A and six terminals are of Class B. At this time, an operation of selecting not nine terminals including terminals of Class A and Class B but nine terminals of Class A only. The remaining six terminals of Class B are processed in step S610 and subsequent steps.

Note that the processing of selecting destination terminals in consideration of Device Class is not limited to the above-described one. For example, a group of terminals of Class A is separated from a group of terminals of Class B, and the all trigger frame transmission processing shown in FIGS. 6A and 6B may be executed for each of the group of terminals of Class A and the group of terminals of Class B.

As described above, according to each of the above-described embodiments, since it is possible to decrease the length of the padding area in the trigger frame, this contributes to improvement of the throughput of the overall system targeted by IEEE802.11ax while improving the use efficiency of the wireless medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus for transmitting, to a plurality of terminals, a trigger frame for executing uplink transmission, the apparatus comprising:
   one or more processors; and
   one or more memories which store instructions executable by the one or more processors to cause the communication apparatus to perform at least:
   obtaining, from each of the plurality of terminals, ability information indicating a preparation time necessary to start transmission after a resource unit to be used is designated by a trigger frame;
   selecting terminals as destination terminals of one trigger frame from the plurality of terminals; and
   transmitting the one trigger frame for the selected terminals by adding a padding area, that corresponds to a maximum preparation time among the preparation times obtained by the selected terminals, to ensure the preparation times of the selected terminals,
   wherein in the selecting, the destination terminals are selected from the plurality of terminals based on the preparation times indicated by the pieces of ability information.

2. The communication apparatus according to claim 1, wherein in the selecting, the destination terminals are selected so that terminals of different preparation times are not mixed in the one trigger frame as long as the number of trigger frames to be transmitted does not increase.

3. The communication apparatus according to claim 1, wherein the number of trigger frames to be transmitted is a smallest integer value not less than a real value obtained by dividing the number of the plurality of terminals by a maximum number of destination terminals that can be included in the one trigger frame.

4. The communication apparatus according to claim 1, wherein the plurality of terminals are formed by terminals to which a trigger frame of a type other than a type in which destination terminals are decided based on downlink communication is transmitted.

5. The communication apparatus according to claim 4, wherein the trigger frame of the type other than the type in which the destination terminals are decided based on the downlink communication is a trigger frame of a type other than Multi User Block Ack Request, (MU-BAR), Multi User Request To Send, (MU-RTS), and Group Cast with Retries multi-user Block Ack Request, (GCR MU-BAR).

6. The communication apparatus according to claim 1, wherein the plurality of terminals are formed by terminals as transmission targets of a trigger frame, whose effective data of responses have the same length.

7. The communication apparatus according to claim 6, wherein the plurality of terminals are formed by terminals whose trigger frame types are Basic Trigger and whose transmission buffer amounts are equal to each other.

8. The communication apparatus according to claim 1, wherein the instructions further cause the communication apparatus to perform assigning Association Identifiers, (AIDs) so that the terminals of the same preparation time are continuous when a type of the trigger frame is Null Data Packet Feedback Report Poll, (NFRP).

9. The communication apparatus according to claim 1, wherein in the transmitting, the time ensured by the padding area is decreased by arranging a field corresponding to a terminal whose preparation time is short after a field corresponding to a terminal whose preparation time is long in the one trigger frame.

10. The communication apparatus according to claim 1, wherein in the selecting, terminals of the same transmission quality are preferentially selected as the destination terminals of the one trigger frame.

11. The communication apparatus according to claim 1, wherein
the communication apparatus is an access point complying with IEEE802.11ax, and
the ability information indicating the preparation time is Min TrigProcTime defined in IEEE802.11ax.

12. The communication apparatus according to claim 11, wherein in the obtaining, MinTrigProcTime is obtained from a Trigger Frame Mac Padding Duration of a High Efficiency (HE) Capabilities element in a Management frame.

13. A control method for a communication apparatus for transmitting, to a plurality of terminals, a trigger frame for executing uplink transmission, the method comprising:
obtaining, from each of the plurality of terminals, ability information indicating a preparation time necessary to start transmission after a resource unit to be used is designated by a trigger frame;
selecting terminals as destination terminals of one trigger frame from the plurality of terminals; and
transmitting the one trigger frame for the selected terminals by adding a padding area, that corresponds to a maximum preparation time among the preparation times obtained by the selected terminals, to ensure the preparation times of the selected terminals,
wherein in the selecting, the terminals are selected from the plurality of terminals based on the preparation times indicated by the pieces of ability information.

14. A non-transitory computer-readable storage medium storing a program for causing a computer to execute a control method for a communication apparatus for transmitting, to a plurality of terminals, a trigger frame for executing uplink transmission, the method comprising:
obtaining, from each of the plurality of terminals, ability information indicating a preparation time necessary to start transmission after a resource unit to be used is designated by a trigger frame;
selecting terminals as destination terminal of one trigger frame from the plurality of terminals; and
transmitting the one trigger frame for the selected terminals by adding a padding area, that corresponds to a maximum preparation time among the preparation times obtained by the selected terminals, to ensure the preparation times of the selected terminals,
wherein in the selecting, the terminals are selected from the plurality of terminals based on the preparation times indicated by the pieces of ability information.

15. A communication apparatus for transmitting, to a plurality of terminals, a trigger frame for executing uplink transmission, the apparatus comprising:
one or more processors; and
one or more memories which store instructions executable by the one or more processors to cause the information processing apparatus to perform at least:
obtaining, from each of the plurality of terminals, ability information indicating a preparation time necessary to start transmission after a resource unit to be used is designated by a trigger frame;
selecting terminals as destination terminals of one trigger frame from the plurality of terminals; and
transmitting the one trigger frame for the selected terminals by adding a padding area to ensure the preparation times of the selected terminals,
wherein in the selecting, the destination terminals are selected from the plurality of terminals based on the preparation times indicated by the pieces of ability information,
wherein in selecting, a selection order of the plurality of terminals is decided so that terminals of the same preparation time are continuous, and the destination terminals of the one trigger frame are selected in the selection order.

* * * * *